(12) United States Patent
Togawa

(10) Patent No.: US 11,288,161 B2
(45) Date of Patent: Mar. 29, 2022

(54) ANOMALY DETECTION METHOD, SYSTEM, AND PROGRAM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 149 days.

(21) Appl. No.: 16/470,281

(22) PCT Filed: Dec. 27, 2016

(86) PCT No.: PCT/JP2016/005238
§ 371 (c)(1),
(2) Date: Jun. 17, 2019

(87) PCT Pub. No.: WO2018/122889
PCT Pub. Date: Jul. 5, 2018

(65) Prior Publication Data
US 2020/0089590 A1 Mar. 19, 2020

(51) Int. Cl.
*G06F 11/00* (2006.01)
*G06F 11/30* (2006.01)
*G06F 11/07* (2006.01)

(52) U.S. Cl.
CPC ........ *G06F 11/3082* (2013.01); *G06F 11/076* (2013.01); *G06F 11/0772* (2013.01); *G06F 11/3075* (2013.01)

(58) Field of Classification Search
CPC .............. G06F 11/0751; G06F 11/076; G06F 11/0766; G06F 11/3075; G06F 11/3452; G06F 11/3466
See application file for complete search history.

(56) References Cited

U.S. PATENT DOCUMENTS

| 9,621,576 | B1* | 4/2017 | Oprea | H04L 63/1425 |
| 2008/0126538 | A1* | 5/2008 | Uyama | H04L 41/147 |
| | | | | 709/224 |

(Continued)

FOREIGN PATENT DOCUMENTS

| JP | 2001-188694 A | 7/2001 |
| JP | 2002-055853 A | 2/2002 |

(Continued)

OTHER PUBLICATIONS

Takemori et al., "A Support System for Analyzing Log Information of Security Devices Applied to Wide Area Monitoring", Computer Security Symposium 2003, vol. 2003, No. 15, pp. 397-402 (6 pages total).

(Continued)

*Primary Examiner* — Charles Ehne
(74) *Attorney, Agent, or Firm* — Sughrue Mion, PLLC

(57) ABSTRACT

The present invention provides an anomaly detection method, an anomaly detection system, and an anomaly detection program that can detect an anomaly at high accuracy by using log output quantity distributions generated for to different aggregate units and different devices. An anomaly detection system according to one example embodiment of the present invention has: a reference distribution, which is a time-series distribution of a log output quantity acquisition unit that acquires a plurality of distributions generated for each device that outputs logs and for each unit of a time range in which logs are aggregated; and an anomaly detection unit that detects an anomaly by using the plurality of distributions.

10 Claims, 11 Drawing Sheets

(56) References Cited

U.S. PATENT DOCUMENTS

2011/0246837 A1   10/2011  Kato
2015/0205690 A1    7/2015  Seto
2016/0330219 A1*  11/2016  Hasan .................... G06N 5/025

FOREIGN PATENT DOCUMENTS

| JP | 2005-196675 A | 7/2005 |
|---|---|---|
| JP | 2005-236862 A | 9/2005 |
| JP | 2011-034208 A | 2/2011 |
| JP | 2013-229064 A | 11/2013 |
| JP | 2016-184358 A | 10/2016 |

OTHER PUBLICATIONS

International Search Report dated Mar. 21, 2017 in International Application No. PCT/JP2016/005238.
Written Opinion of the International Searching Authority dated Mar. 21, 2017 in International Application No. PCT/JP2016/005238.
Japanese Office Action for JP Application No. 2018-558510 dated Apr. 21, 2020 with English Translation.
Japanese Office Action for JP Application No. 2020-141475 dated Aug. 17, 2021 with English Translation.

* cited by examiner

FIG. 2

| Log |
|---|
| 2015/08/17 08:27:18　　process is started |
| 2015/08/17 08:28:37　[SV003] JNW 3258　　is started [192.168.1.23] |
| 2015/08/17 08:29:18　[SV003] JNW 3258　　is finished [192.168.1.23] |
| 2015/08/17 08:29:59　[SV003] JNW 082　　is started [192.168.1.23] |
| 2015/08/17 08:30:15　[SV003] JNW 082　　is finished [192.168.1.23] |
| 2015/08/17 08:30:37　　process is finished |
| ⋮ |

FIG. 3

| Format ID | Format |
|---|---|
| 1 | <variable: time stamp> [<variable: character string>] JNW <variable: numerical value> is started [<variable: IP>] |
| 3 | <variable: time stamp> [<variable: character string>] JNW <variable: numerical value> is finished [<variable: IP>] |
| 5 | <variable: time stamp> process is started |
| 6 | <variable: time stamp> process is finished |
| 14 | <variable: time stamp> [PF] anomaly occurred on alive monitoring [<variable: IP>] |

FIG. 5

| AGGREGATE UNIT NO. | AGGREGATE UNIT |
|---|---|
| 1 | 10 MINUTES |
| 2 | 1 HOUR |
| 3 | 1 DAY (ANY DAY) |
| 4 | 1 DAY (SUNDAY) |
| 5 | 1 DAY (MONDAY) |
| 6 | 1 DAY (TUESDAY) |
| 7 | 1 DAY (WEDNESDAY) |
| 8 | 1 DAY (THURSDAY) |
| 9 | 1 DAY (FRIDAY) |
| 10 | 1 DAY (SATURDAY) |
| 11 | 1 PAST DAY |
| 12 | 1 PAST WEEK |
| 13 | 1 PAST MONTH |
| ⋮ | |

ANOMALY DETECTION METHOD, SYSTEM, AND PROGRAM

This application is a National Stage Entry of PCT/JP2016/005238 filed on Dec. 27, 2016, the contents of all of which are incorporated herein by reference, in their entirety.

TECHNICAL FIELD

The present invention relates to an anomaly detection method, an anomaly detection system, and an anomaly detection program that detect an anomaly from logs.

BACKGROUND ART

In systems executed on computers, in general, logs including a result of an event, a message, or the like are output. When a system anomaly or the like occurs, a distribution of the output quantity of logs often changes compared to a normal state. This is because, for example, a log which is normally output is not output due to a system anomaly or a log which is not normally output is output due to a system anomaly. A technology that detects an anomaly by using such a change in the output quantity of logs has been conventionally considered.

The technology disclosed in Patent Literature 1 calculates an average and a standard deviation from a distribution of frequencies at which past logs (events) were output and generates a theoretical distribution (a normal distribution, a Poisson distribution, or the like) from the calculated average and standard deviation. This technology then determines based on the theoretical distribution whether or not an anomaly occurs from logs to be analyzed. Further, Patent Literature 1 discloses that anomaly detection is performed by using different statistical methods such as a normal distribution, a Poisson distribution, or the like to generate multiple types of theoretical distributions and selecting an optimum theoretical distribution from multiple types of theoretical distributions.

CITATION LIST

Patent Literature

PTL 1: Japanese Patent Application Laid-Open No. 2005-236862

SUMMARY OF INVENTION

Technical Problem

In general, there are a plurality of factors that cause the log output quantity to vary, and a main factor that affects the log output quantity may change in accordance with a unit of time in which logs are aggregated (hourly, daily, or the like). Therefore, when an average state on which the logs output in a certain period in the past are averaged is defined as a reference, an anomaly may not be appropriately detected. Further, since the characteristics are different for respective devices even when the devices are of the same type, the features of distributions of the log output quantity are also different for respective devices. Therefore, when an average state in which logs output from a plurality of devices are averaged is defined as a reference, the features of the distribution for each device and each aggregate unit are hidden behind, and thus an anomaly may not be appropriately detected.

However, Patent Literature 1 discloses that a distribution selected from distributions resulted from different statistical schemes is used as a criterion for anomaly detection but does not consider a use of distributions of logs for different aggregate units and different devices.

The present invention has been made in view of the problems described above and intends to provide an anomaly detection method, an anomaly detection system, and an anomaly detection program that can detect an anomaly at high accuracy by using log output quantity distributions generated for different aggregate units and different devices.

A first example aspect of the present invention is an anomaly detection method including steps of: acquiring a plurality of distributions generated for each device that outputs logs and for each unit of a time range in which logs are aggregated; and detecting an anomaly by using the plurality of distributions, and each of the plurality of distributions is a time-series distribution of an output quantity of the logs in the unit.

A second example aspect of the present invention is an anomaly detection program that causes a computer to perform steps of: acquiring a plurality of distributions generated for each device that outputs logs and for each unit of a time range in which logs are aggregated; and detecting an anomaly by using the plurality of distributions, and each of the plurality of distributions is a time-series distribution of an output quantity of the logs in the unit.

A third example aspect of the present invention is an anomaly detection system having: a distribution acquisition unit that acquires a plurality of distributions generated for each device that outputs logs and for each unit of a time range in which logs are aggregated; and an anomaly detection unit that detects an anomaly by using the plurality of distributions, and each of the plurality of distributions is a time-series distribution of an output quantity of the logs in the unit.

According to the present invention, since an anomaly is detected by using a plurality of distributions generated for each device that outputs logs and for each aggregate unit of logs, it is possible to detect an anomaly at high accuracy by taking advantage of characteristics of the distribution for each device and for each aggregate unit.

BRIEF DESCRIPTION OF DRAWINGS

FIG. 2 is a schematic diagram of an analysis target log according to the first example embodiment.

FIG. 3 is a schematic diagram of a format according to the first example embodiment.

FIG. 5 is a schematic diagram of an exemplary aggregate unit according to the first example embodiment.

DESCRIPTION OF EMBODIMENTS

Figure 1:
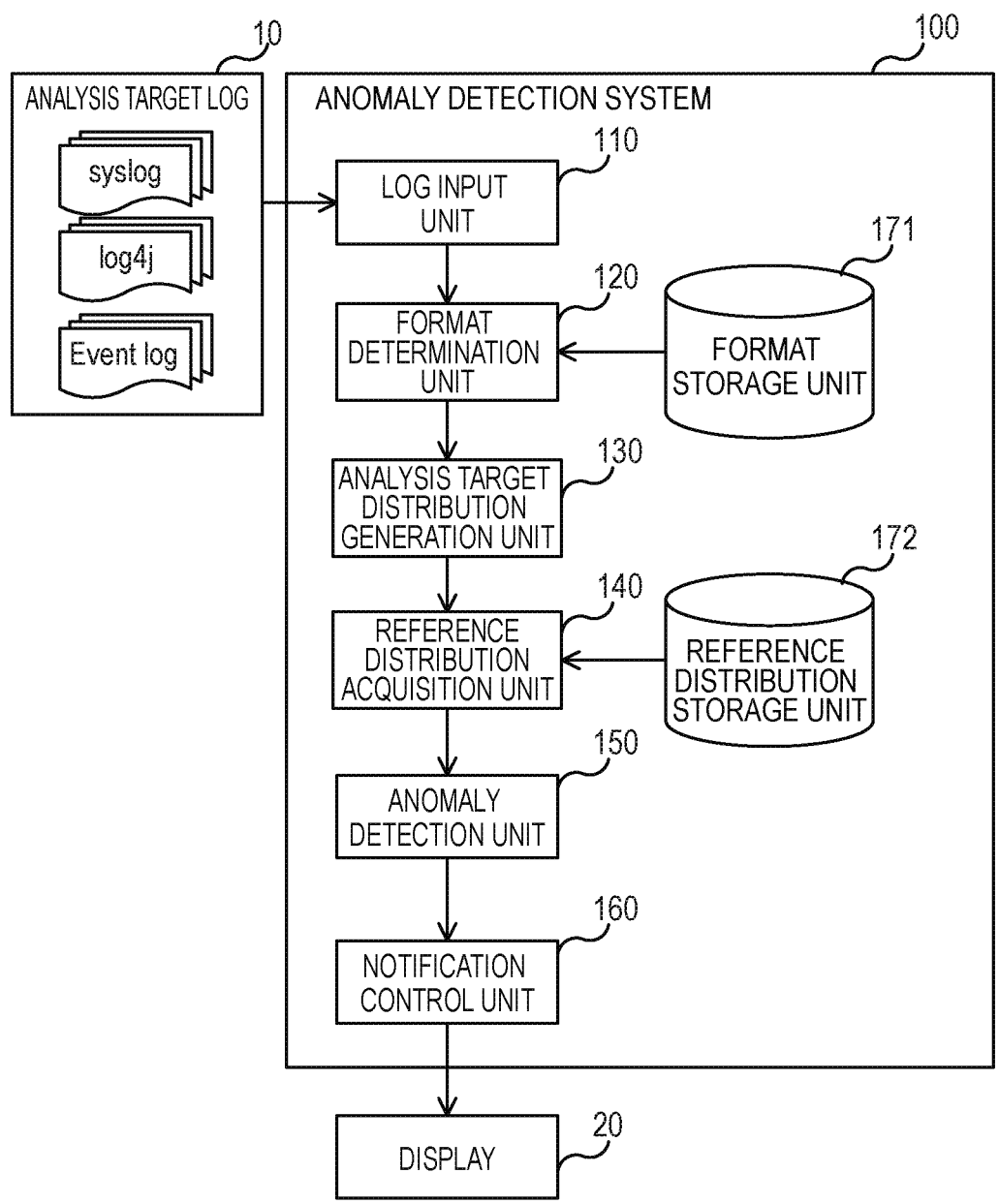
FIG. 1 is a block diagram of an anomaly detection system according to a first example embodiment.

While example embodiments of the present invention will be described below with reference to the drawings, the present invention is not limited to the present example embodiments. Note that, in the drawings described below, components having the same function are labeled with the same reference symbols, and the duplicated description thereof may be omitted.

First Example Embodiment

FIG. 1 is a block diagram of an anomaly detection system 100 according to the present example embodiment. In FIG. 1, arrows represent main dataflows, and there may be other dataflows than those illustrated in FIG. 1. In FIG. 1, each block illustrates a configuration in a unit of function rather than in a unit of hardware (device). Therefore, the blocks illustrated in FIG. 1 may be implemented in a single device or may be implemented independently in a plurality of devices. Transmission and reception of the data between blocks may be performed via any member, such as a data bus, a network, a portable storage medium, or the like.

The anomaly detection system 100 includes, as a processing unit, a log input unit 110, a format determination unit 120, an analysis target distribution generation unit 130, a reference distribution acquisition unit 140, an anomaly detection unit 150, and a notification control unit 160. Further, the anomaly detection system 100 includes, as a storage unit, a format storage unit 171 and a reference distribution storage unit 172.

The log input unit 110 receives an analysis target log 10 to be an analysis target and inputs the received analysis target log 10 into the anomaly detection system 100. The analysis target log 10 may be acquired from the outside of the anomaly detection system 100 or may be acquired by reading pre-stored logs inside the anomaly detection system 100. The analysis target log 10 includes one or more logs output from one or more devices or programs. The analysis target log 10 is a log represented in any data form (file form), which may be, for example, binary data or text data. Further, the analysis target log 10 may be stored as a table of a database or may be stored as a text file.

FIG. 2 is a schematic diagram of an exemplary analysis target log 10. The analysis target log 10 according to the present example embodiment includes any number of one or more logs, where one log output from a device or a program is defined as one unit. One log may be one line of character string or two or more lines of character strings. That is, the analysis target log 10 refers to the entire logs included in the analysis target log 10, and a log refers to a single log extracted from the analysis target log 10. Each log includes a time stamp, a message, and the like. The anomaly detection system 100 can analyze not only a specific type of logs but also broad types of logs. For example, any log that records a message output from an operating system, an application, or the like, such as syslog, an event log, or like, can be used as the analysis target log 10.

The format determination unit 120 determines which format (form) pre-stored in the format storage unit 171 each log included in the analysis target log 10 conforms to and divides each log into a variable part and a constant part by using the conforming format. The format is a predetermined form of a log based on characteristics of the log. The characteristics of the log include a property of being likely to vary or less likely to vary between logs similar to each other or a property of having description of a character string considered as a part which is likely to vary in the log. The variable part is a part that may vary in the format, and the constant part is a part that does not vary in the format. The value (including a numerical value, a character string, and other data) of the variable part in the input log is referred to as a variable value. The variable part and the constant part are different on a format basis. Thus, there is a possibility that the part defined as the variable part in a certain format is defined as the constant part in another format or vice versa.

FIG. 3 is a schematic diagram of an exemplary format stored in the format storage unit 171. A format includes a character string representing a format associated with a unique format ID. By describing a predetermined identifier in a part, which may vary, of a log, the format defines the variable part and defines the part of the log other than the variable part as the constant part. As an identifier of the variable part, for example, "<variable: time stamp>" indicates the variable part representing a time stamp, "<variable: character string>" indicates the variable part representing any character string, "<variable: numerical value>" indicates the variable part representing any numerical value, and "<variable: IP>" indicates the variable part representing any IP address. The identifier of a variable part is not limited thereto but may be defined by any method such as a regular expression, a list of values which may be taken, or the like. A format may be formed of only the variable part without including the constant part or only the constant part without including the variable part.

For example, the format determination unit 120 determines that the log on the third line of FIG. 2 conforms the format whose ID of FIG. 3 is 1. Then, the format determination unit 120 processes the log based on the determined format and determines "2015, Aug. 17 08:28:37", which is time stamp, "SV003", which is the character string, "3258", which is the numerical value, and "192.168.1.23", which is the IP address, as variable values.

In FIG. 3, although the format is represented by the list of character strings for better visibility, the format may be represented in any data form (file form), for example, binary data or text data. Further, a format may be stored in the format storage unit 171 as a binary file or a text file or may be stored in the format storage unit 171 as a table of a database.

The analysis target distribution generation unit 130, the reference distribution acquisition unit 140, and the anomaly detection unit 150 detect an anomaly by using an analysis target distribution generated from the analysis target log 10 and a reference distribution selected from the reference distribution storage unit 172 based on the analysis target distribution by an anomaly detection method described below.

Figure 4:
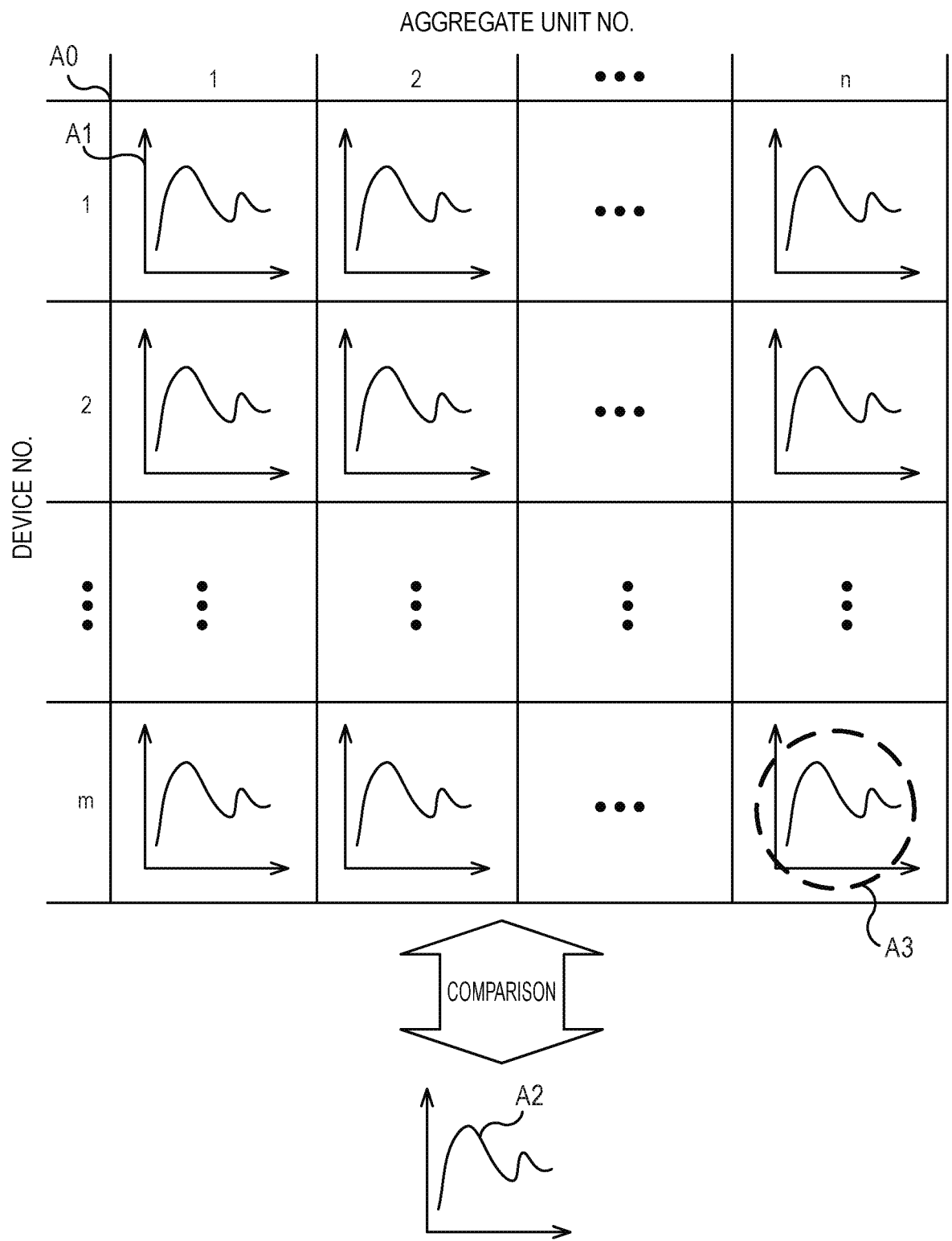
FIG. 4 is a schematic diagram of an anomaly detection method according to the first example embodiment.

FIG. 4 is a schematic diagram of the anomaly detection method according to the present example embodiment. A reference distribution matrix A0 is stored in advance in the reference distribution storage unit 172. The reference distribution matrix A0 is a set of log output quantity distributions A1 generated for each combination of an aggregate unit and a device. The log output quantity distribution A1 is generated for at least two aggregate units and for at least two devices. The reference distribution matrix A0 may be generated by using the log output quantity of a single format, may be generated by using the sum of the log output quantity of a plurality of formats, or may be generated by using the sum of the log output quantity of all the formats. That is, in the present example embodiment, the reference distribution matrix A0 is a set of distributions generated from the log output quantity of one or a plurality of predetermined formats.

The aggregate unit defines a length of a time range in which aggregation is to be performed for generating the log output quantity distribution A1 and a condition satisfied by the time range. For example, the aggregate unit defines a length such as minutes, hours, days, or the like in which aggregation is to be performed and further defines that the time range satisfies a condition of a particular day of the week or a particular starting point. An aggregate unit number (aggregate unit No.) for identification is assigned to each aggregate unit.

FIG. 5 is a schematic diagram of an exemplary aggregate unit. The aggregate unit is associated with the aggregate unit number (aggregate unit No.) for identification and defined in advance inside the anomaly detection system 100. The aggregate unit is a rule that defines a time range used for generating a log output quantity distribution A1 included in the reference distribution matrix A0. That is, the log output quantity distribution A1 is generated by aggregating the number of logs (formats) output in the past in accordance with the aggregate unit. When the aggregate unit is "10 minutes", for example, the average of the time-series distribution of the logs output for 10 minutes (that is, within 10 minutes from a time of day N, the time N is arbitrary) out of the logs output in the past is denoted as the log output quantity distribution A1. When the aggregate unit is "a day (Sunday)", the average of the time-series distribution of the logs output within one day and on Sunday out of the logs output in the past is denoted as the log output quantity distribution A1. When the aggregate unit is "one past day", the time-series distribution of the logs output within one day back from the present time as a starting point out of the logs output in the past is used as the log output quantity distribution A1. As described above, an aggregate unit defines a length of a time range in which logs are to be aggregated and a condition satisfied by the time range.

The aggregate units illustrated in FIG. 5 are examples, some aggregate units of those illustrated in FIG. 5 may be used, or other aggregate units not illustrated in FIG. 5 may be used. While the aggregate units are illustrated in character strings for better visibility in FIG. 5, the aggregate unit may be any binary data or text data indicating the aggregation rule in an actual implementation.

The device is a device from which logs are output. A device number (device No.) for identification is assigned for each device. Even devices of the same type are assigned with different device numbers when these devices are different entities. Further, when multiple pieces of software that output logs are executed in the same device, different device numbers may be assigned for each software. That is, software that outputs a log is also regarded here as an individual device.

The log output quantity distribution A1 is a time-series distribution of the log output quantity for each combination of an aggregate unit and a device. That is, the log output quantity distribution A1 indicates the time-series transition of the number of the logs output from the device of interest in the time range of the aggregate unit of interest with respect to each combination of the aggregate unit and the device. While the log output quantity distributions A1 are represented as graphs in FIG. 4 for better visibility, the log output quantity distribution A1 may be stored in the reference distribution storage unit 172 as binary data or text data in which the log output quantity is arranged in time series.

The analysis target distribution generation unit 130 generates an analysis target distribution A2 from the analysis target log 10. The analysis target distribution A2 is a time-series distribution of the output quantity of the logs to be analyzed. That is, the analysis target distribution A2 represents the time-series transition of the number of the logs output in the period to be analyzed. The analysis target distribution A2 may be generated by using the logs output from a single device or may be generated by using the logs output from a plurality of devices. One or a plurality of formats to be aggregated in the analysis target distribution A2 are the same as one or a plurality of formats to be aggregated in the reference distribution matrix A0. While the analysis target distribution A2 are represented as graphs in FIG. 4 for better visibility, the analysis target distribution A2 may be generated as binary data or text data in which the log output quantity is arranged in time series.

The reference distribution acquisition unit 140 acquires the distribution that is the most similar to the analysis target distribution A2 out of the log output quantity distributions A1 included in the reference distribution matrix A0 as a reference distribution A3. Specifically, the reference distribution acquisition unit 140 reads the reference distribution matrix A0 from the reference distribution storage unit 172 when anomaly detection is performed. Next, the reference distribution acquisition unit 140 calculates the similarity between each of the log output quantity distributions A1 included in the reference distribution matrix A0 and the analysis target distribution A2. As a similarity, any index indicating the degree at which the log output quantity distribution A1 and the analysis target distribution A2 are similar to each other can be used, and a correlation coefficient may be used, for example. A higher correlation coefficient indicates a higher similarity between the log output quantity distribution A1 and the analysis target distribution A2. The reference distribution acquisition unit 140 then selects the distribution that is the most similar to the analysis target distribution A2 (for example, the distribution that has the highest similarity) out of the log output quantity distributions A1 included in the reference distribution matrix A0 based on the calculated similarity as the reference distribution A3.

The anomaly detection unit 150 detects an anomaly by comparing the reference distribution A3 selected by the reference distribution acquisition unit 140 with the analysis target distribution A2. Specifically, the anomaly detection unit 150 calculates an anomaly degree of the analysis target distribution A2 with respect to the reference distribution A3 as a reference. The anomaly detection unit 150 then detects an anomaly when the calculated anomaly degree is out of a predetermined normal range. As an anomaly degree, any index indicating the degree at which the analysis target distribution A2 is deviated from the reference distribution A3 can be used, and a correlation coefficient may be used, for example. A lower correlation coefficient indicates a higher degree at which the analysis target distribution A2 is deviated from the reference distribution A3.

The notification control unit 160 performs control of notification of information that indicates an anomaly detected by the anomaly detection unit 150 by using a display 20. The notification of an anomaly by the notification control unit 160 is not limited to the display by using the display 20 and may be performed by using any method that can notify the user, such as printing by using a printer, lighting by using a lamp, audio output by using a speaker, or the like.

As described above, in the present example embodiment, the reference distribution acquisition unit 140 selects the reference distribution A3 that is the closest to the analysis target distribution A2 from the log output quantity distributions A1 of various aggregate units and devices, and the anomaly detection unit 150 determines whether or not the analysis target distribution A2 is abnormal with respect to the selected reference distribution A3 as a reference. Therefore, an anomaly can be detected at high accuracy by using a reference closer to the analysis target distribution A2.

While the analysis target distribution A2 is compared to all of the log output quantity distributions A1 included in the reference distribution matrix A0 in the present example embodiment, the comparison may be limited to the analysis target distribution A2 and the log output quantity distributions A1 generated in the same aggregate unit. For example, the analysis target distribution generation unit 130 generates the analysis target distribution A2 in an aggregate unit of 10 minutes and the reference distribution acquisition unit 140 extracts the log output quantity distribution A1 with aggregate unit number 1 (for 10 minutes) from the reference distribution matrix A0 and calculates the similarity, and the reference distribution A3 is selected therefrom.

While an anomaly is detected by using one analysis target distribution A2 in the present example embodiment, an anomaly may be detected by using a combination of a plurality of analysis target distributions A2. For example, the analysis target distribution generation unit 130 generates two analysis target distributions A2 with different aggregate units (for example, for 10 minutes and for 1 hour) from the analysis target log 10. Next, the reference distribution acquisition unit 140 calculates two similarities for two log output quantity distributions A1 with the same aggregate units (that is, for 10 minutes and for 1 hour) in each device number. The reference distribution acquisition unit 140 then selects two log output quantity distributions A1, which have the highest sum of two similarities for one device number (that is, which are the most similar), as two reference distributions A3. The number of the analysis target distributions A2 is not limited to two and may be any number.

Figure 6:
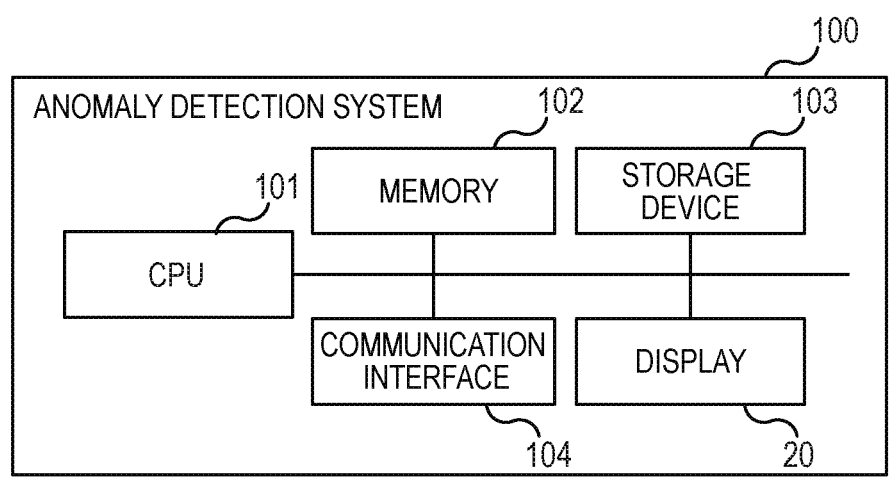
FIG. 6 is a general configuration diagram of the anomaly detection system according to the first example embodiment.

FIG. 6 is a schematic configuration diagram illustrating an exemplary device configuration of the anomaly detection system 100 according to the present example embodiment. The anomaly detection system 100 includes a central processing unit (CPU) 101, a memory 102, a storage device 103, a communication interface 104, and the display 20. The anomaly detection system 100 may be a separate device or may be integrally configured with another device.

The communication interface 104 is a communication unit that transmits and receives data and is configured to be able to execute at least one of the communication schemes of wired communication and wireless communication. The communication interface 104 includes a processor, an electric circuit, an antenna, a connection terminal, or the like required for the above communication scheme. The communication interface 104 is connected to a network using the communication scheme in accordance with a signal from the CPU 101 for communication. The communication interface 104 externally receives the analysis target log 10, for example.

The storage device 103 stores a program executed by the anomaly detection system 100, data of a process result obtained by the program, or the like. The storage device 103 includes a read only memory (ROM) dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or a program and data read from the storage device 103.

The CPU 101 is a processer that temporarily stores temporary data used for processing in the memory 102, reads a program stored in the storage device 103, and executes various processing operations such as calculation, control, determination, or the like on the temporary data in accordance with the program. Further, the CPU 101 stores data of the process result in the storage device 103 and also transmits data of the process result externally via the communication interface 104.

In the present example embodiment, the CPU 101 functions as the log input unit 110, the format determination unit 120, the analysis target distribution generation unit 130, the reference distribution acquisition unit 140, the anomaly detection unit 150, and the notification control unit 160 of FIG. 1 by executing the program stored in the storage device 103. Further, in the present example embodiment, the storage device 103 functions as the format storage unit 171 and the reference distribution storage unit 172 of FIG. 1.

The display 20 is a display device that displays information to the user. Any display device such as a cathode ray tube (CRT) display, a liquid crystal display, or the like may be used as the display 20. The display 20 displays predetermined information in accordance with a signal from the CPU 101.

The anomaly detection system 100 is not limited to the specific configuration illustrated in FIG. 6. The anomaly detection system 100 is not limited to a single device and may be configured such that two or more physically separated devices are connected by wired or wireless connection. Respective components included in the anomaly detection system 100 may be implemented by an electric circuitry, respectively. The electric circuitry here is a term conceptually including a single device, multiple devices, a chipset, or a cloud.

Further, at least a part of the anomaly detection system 100 may be provided in a form of Software as a Service (SaaS). That is, at least some of the functions for implementing the anomaly detection system 100 may be executed by software executed via a network.

Figure 7:
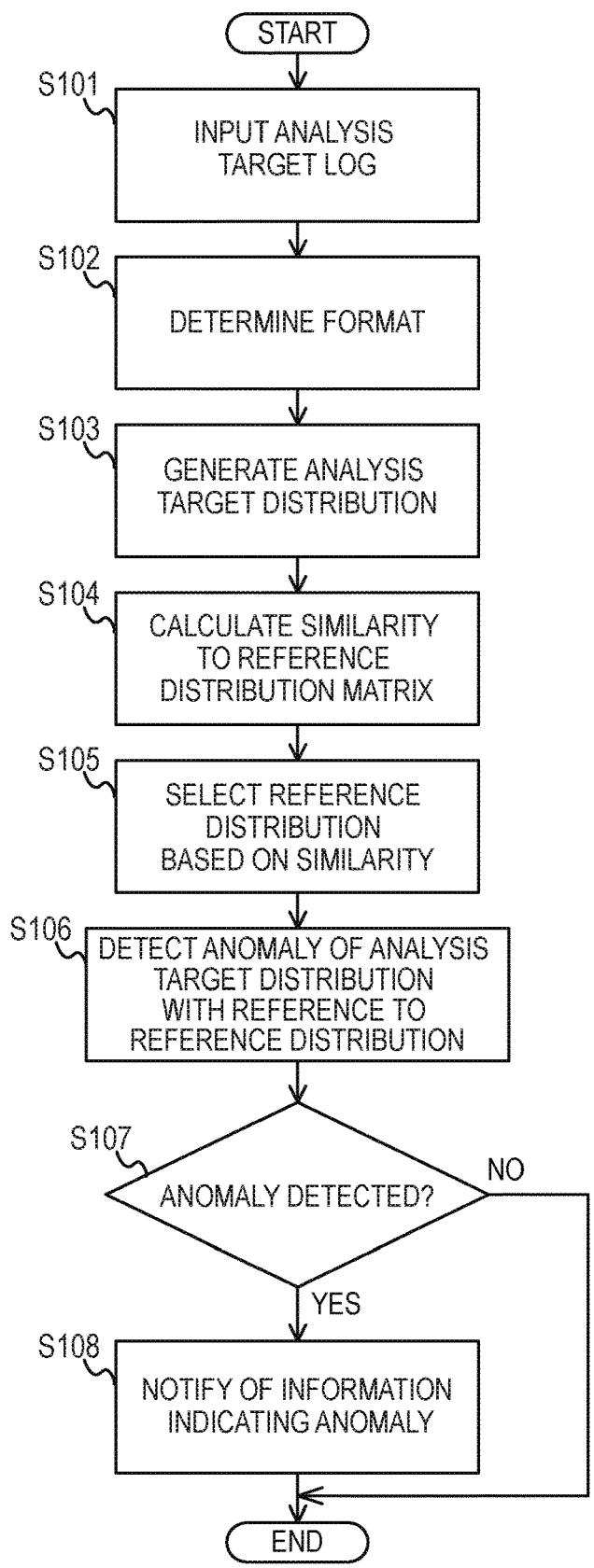
FIG. 7 is a diagram illustrating a flowchart of an anomaly detection method according to the first example embodiment.

FIG. 7 is a diagram illustrating a flowchart of an anomaly detection method using the anomaly detection system 100 according to the present example embodiment. The flowchart in FIG. 7 is started when a user performs a predetermined operation used for performing anomaly detection on the anomaly detection system 100, for example. First, the log input unit 110 receives the analysis target log 10 and inputs the analysis target log 10 to the analysis detection system 100 (step S101). The format determination unit 120 determines which format stored in the format storage unit 171 the log matches for each log included the analysis target log 10 input in step S101 (step S102).

Next, the analysis target distribution generation unit 130 extracts a log with a predetermined format to be analyzed from the logs whose format is determined in step S102 and generates a time-series distribution of the number of the output logs of interest as an analysis target distribution (step S103). An analysis target distribution may be generated here for the entire period of the analysis target log, and an analysis target distribution may be generated for one or a plurality of predetermined aggregate units.

The reference distribution acquisition unit 140 reads the reference distribution matrix from the reference distribution storage unit 172 and calculates the similarity between each of the log output quantity distributions included in the reference distribution matrix and the analysis target distribution generated in step S103 (step S104). The reference distribution acquisition unit 140 then selects the distribution which is the most similar to the analysis target distribution (for example, the distribution that has the highest similarity) out of the log output quantity distributions included in the reference distribution matrix as a reference distribution based on the similarity calculated in step S104 (step S105).

The anomaly detection unit 150 calculates the anomaly degree of the analysis target distribution with respect to the reference distribution selected in step S105 as a reference. The anomaly detection unit 150 then detects an anomaly when the calculated anomaly degree is out of the predetermined normal range (step S106).

When an anomaly is detected in step S106 (step S107, YES), the notification control unit 160 performs control of notification of information that indicates the anomaly detected by using the display 20 (step S108). After notification is performed in step S108 or when no anomaly is detected in step S106 (step S107, NO), the anomaly detection method ends.

The CPU 101 of the anomaly detection system 100 is a subject of each step (process) included in the anomaly detection method illustrated in FIG. 7. That is, the CPU 101 performs the anomaly detection method illustrated in FIG. 7 by reading the program used for executing the anomaly detection method illustrated in FIG. 7 from the memory 102 or the storage device 103, executing the program, and controlling each component of the anomaly detection system 100.

In a conventional anomaly detection method, since a averaged distribution for various aggregate units and devices is used as a reference for anomaly detection, the features of the distribution for each aggregate unit and each device are hidden behind, and an anomaly may not be accurately detected. On the other hand, in the anomaly detection system 100 according to the present example embodiment, the reference distribution acquisition unit 140 selects the reference distribution A3 that is the most similar to the analysis target distribution A2 from the log output quantity distributions A1 for various aggregate units and devices and determines whether or not the analysis target distribution A2 is abnormal with respect to the selected reference distribution A3 as a reference. Therefore, by taking advantage of characteristics of the distribution for each aggregate unit and for each device, it is possible to detect an anomaly at high accuracy by using the reference close to the analysis target distribution A2.

Second Example Embodiment

In the first example embodiment, an anomaly of the analysis target distribution is detected by comparing the analysis target distribution with the reference distribution matrix. On the other hand, in the present example embodiment, an abnormal distribution or an abnormal device is detected by extracting a distribution deviated from the reference distribution matrix.

Figure 8:
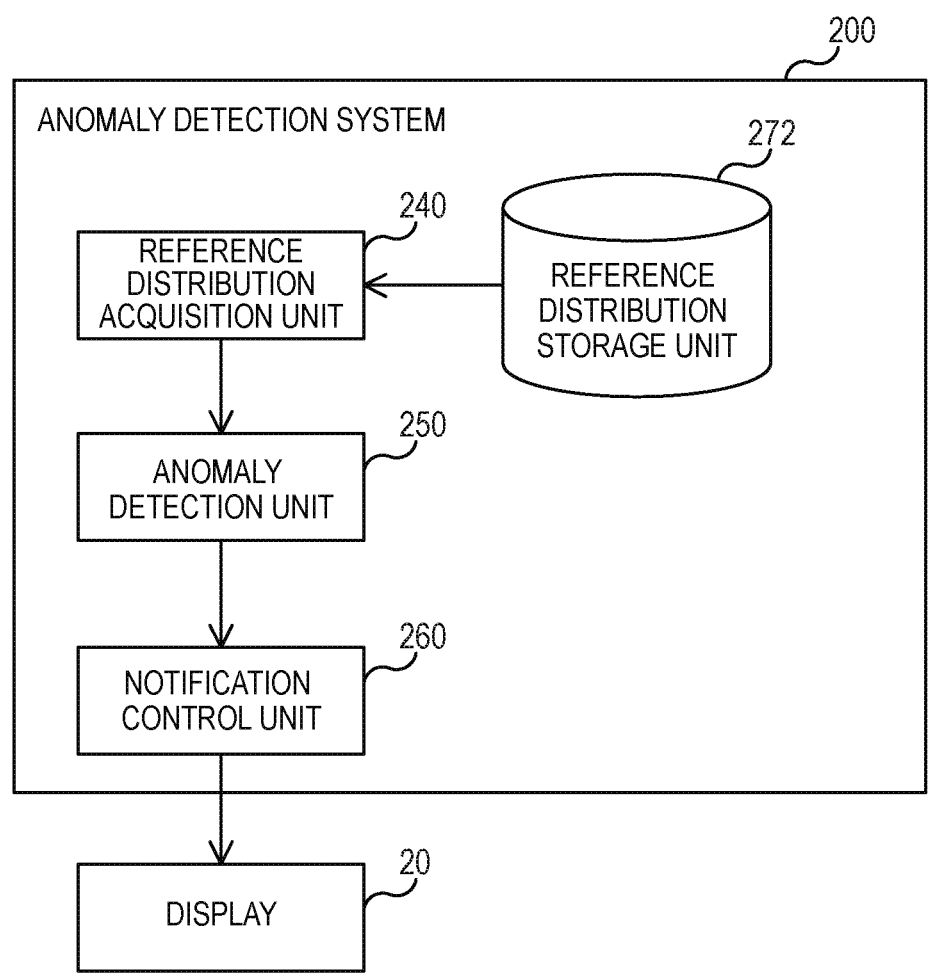
FIG. 8 is a block diagram of an anomaly detection system according to a second example embodiment.

FIG. 8 is a block diagram of an anomaly detection system 200 according to the present example embodiment. In FIG. 1, arrows represent main dataflows, and there may be other dataflows than those illustrated in FIG. 8. In FIG. 8, each block illustrates a configuration in a unit of function rather than in a unit of hardware (device). Therefore, the blocks illustrated in FIG. 8 may be implemented in a single device or may be implemented independently in a plurality of devices. Transmission and reception of the data between blocks may be performed via any member, such as a data bus, a network, a portable storage medium, or the like.

The anomaly detection system 200 has a reference distribution acquisition unit 240, an anomaly detection unit 250, and a notification control unit 260 as processing units. Further, the anomaly detection system 200 has a reference distribution storage unit 272 as a storage unit. The device configuration of the anomaly detection system 200 may be the same as that in FIG. 6. The reference distribution acquisition unit 240 and the anomaly detection unit 250 detect an anomaly from the reference distribution matrix by using an anomaly detection method described below.

Figure 9:
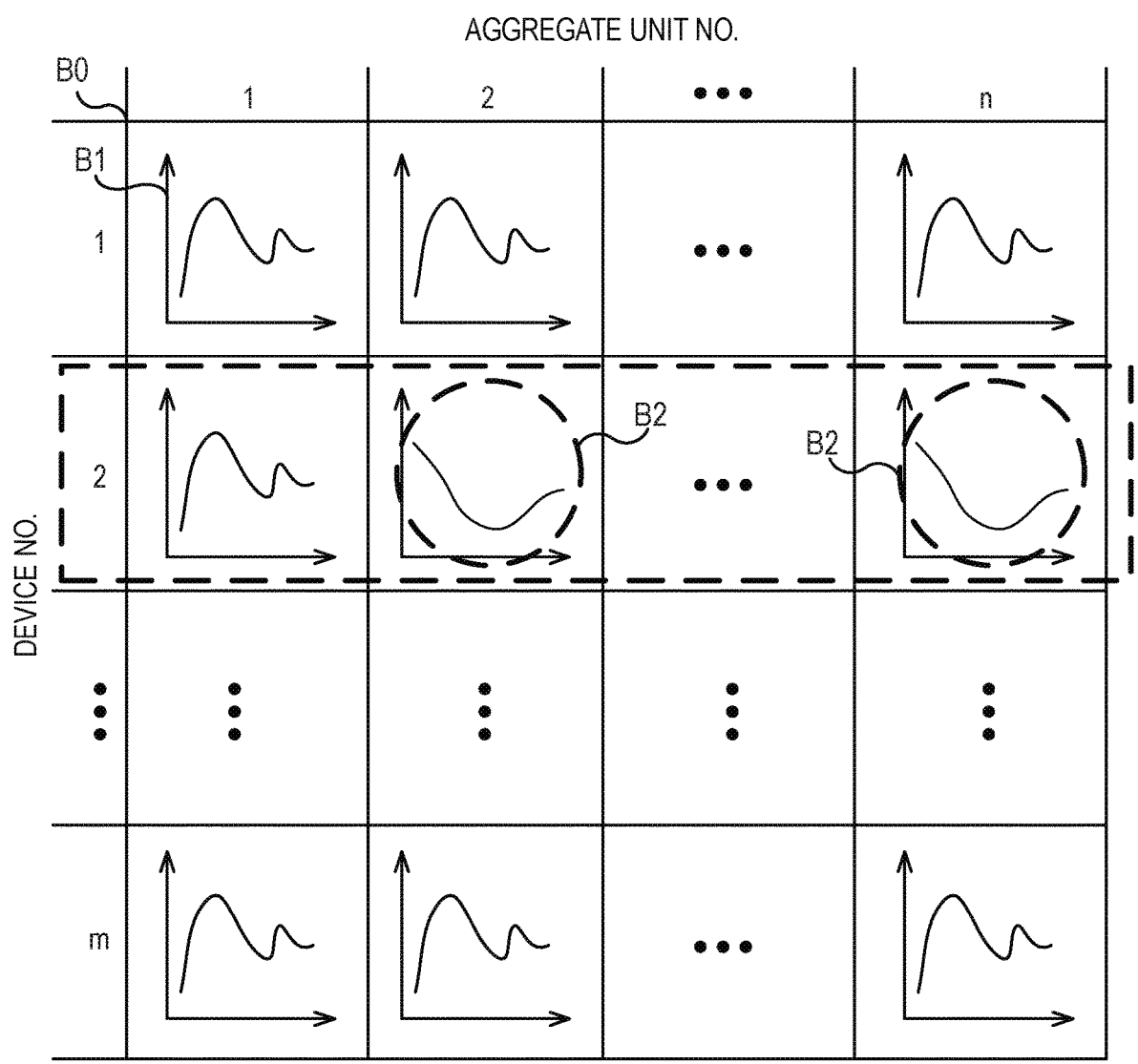
FIG. 9 is a schematic diagram of an anomaly detection method according to the second example embodiment.

FIG. 9 is a schematic diagram of the anomaly detection method according to the present example embodiment. A reference distribution matrix B0 is pre-stored in the reference distribution storage unit 272. The reference distribution matrix B0 is a set of log output quantity distributions B1 generated for each combination of an aggregate unit and a device. The definitions of the aggregate unit and the device are the same as those in the first example embodiment. Further, the log output quantity distribution B1 is generated in the same manner as the log output quantity distribution A1 of the first example embodiment.

The reference distribution acquisition unit 240 reads the reference distribution matrix B0 from the reference distribution storage unit 272 when anomaly detection is performed. The anomaly detection unit 250 calculates a device average distribution by averaging the log output quantity distributions B1 included in the reference distribution matrix B0 for each device (device number). Next, the anomaly detection unit 250 calculates the similarity between the calculated device average distributions and generates a group of devices (for example, a group of devices having the similarity that is greater than or equal to a predetermined threshold) based on the similarity. A known clustering method may be used for grouping the devices. The anomaly detection unit 250 performs an anomaly detection process described below for each group of devices. Further, the anomaly detection process described below may be performed for all of the devices without grouping the devices.

The anomaly detection unit 250 calculates an average distribution for each aggregate unit by averaging the distributions B1 with respect to each aggregate unit and calculates the similarity between the calculated average distribution and each distribution B1 of the aggregate unit. The anomaly detection unit 250 then extracts a distribution B1 that is deviated from the average distribution for each aggregate unit (for example, the similarity to the average distribution is lower than or equal to a predetermined threshold) as an abnormal distribution B2. Further, the predetermined number of distributions B1 may be extracted as the abnormal distributions B2 in ascending order of similarity to the average distribution.

As another method, the anomaly detection unit 250 calculates the similarity between the distributions B1 included in each aggregate unit and extracts a distribution that is out of other distributions included in the same aggregate unit, that is, the distribution B1 having a low total value or a low average value of the similarity to other distributions, as the abnormal distribution B2. Further, the predetermined number of distributions B1 may be extracted as an abnormal distribution B2 in ascending order of the total value or the average value of the similarity to other distributions.

The method of extracting the abnormal distribution B2 from the reference distribution matrix B0 is not limited to that described here, and any method that can extract a deviated distribution for each aggregate unit may be used.

Further, the anomaly detection unit 250 calculates the number or a ratio of the abnormal distributions B2 out of the distributions B1 related to each device (device number) and detects a device having the calculated number or the calculated ratio that is greater than or equal to a predetermined threshold as an abnormal device.

The notification control unit 260 performs control of notification of information that indicates an anomaly detected by the anomaly detection unit 250 by using the display 20. The notification of the detected anomaly by the notification control unit 260 is not limited to the display by using the display 20 and may be performed by using any method that can notify the user, such as printing by using a printer, lighting by using a lamp, audio output by using a speaker, or the like.

Figure 10:
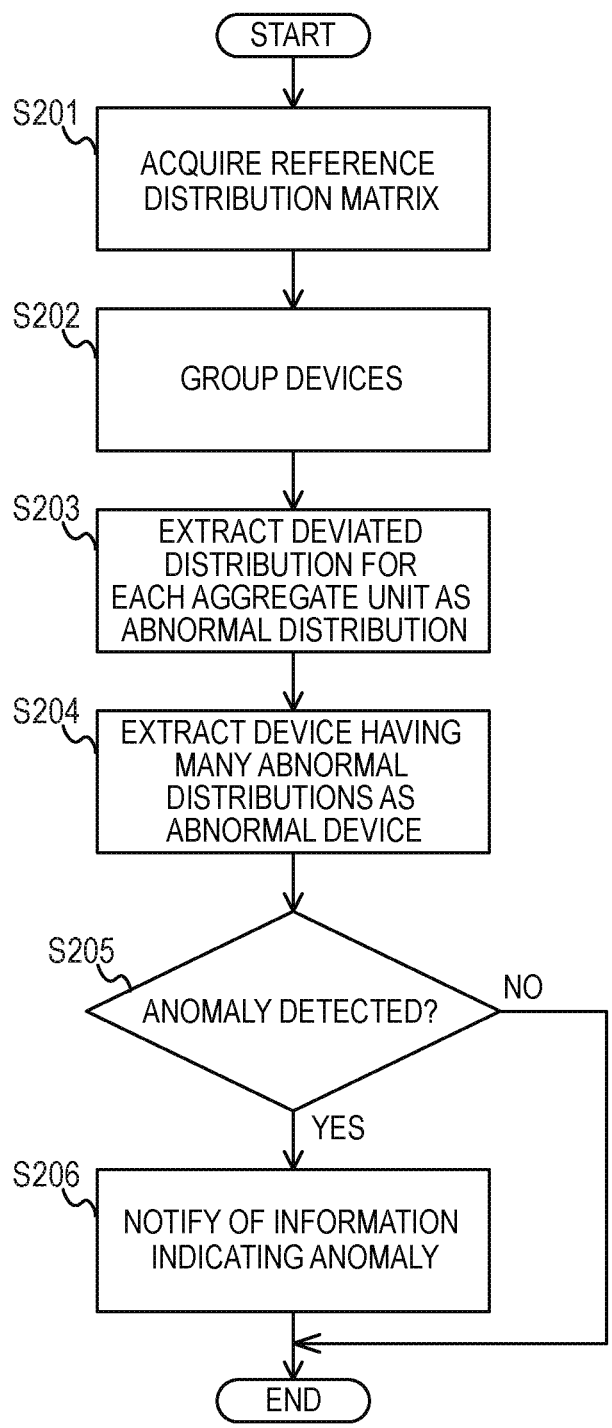
FIG. 10 is a diagram illustrating a flowchart of the anomaly detection method according to the second example embodiment.

FIG. 10 is a diagram illustrating a flowchart of the anomaly detection method using the anomaly detection system 200 according to the present example embodiment. The flowchart in FIG. 10 is started when the user performs a predetermined operation used for performing anomaly detection on the anomaly detection system 200, for example. First, the reference distribution acquisition unit 240 reads and acquires the reference distribution matrix from the reference distribution storage unit 272 (step S201).

The anomaly detection unit 250 calculates a device average distribution by averaging the log output quantity distributions included in the reference distribution matrix acquired in step S201 for each device (device number). Next, the anomaly detection unit 250 calculates the similarity between the calculated device average distributions and generates a group of devices based on the similarity (step S202). The following process is performed for each group of devices.

The anomaly detection unit 250 extracts a deviated distribution for each aggregate unit as an abnormal distribution out of the log output quantity distributions included in the reference distribution matrix acquired in step S201 (step S203).

Further, the anomaly detection unit 250 calculates the number or a ratio of the abnormal distributions extracted in step S203 for each device (device number) and detects a device having the calculated number or the calculated ratio that is greater than or equal to a predetermined threshold as an abnormal device (step S204).

When an abnormal distribution or an abnormal device is detected in steps S203 to S204 (step S205, YES), the notification control unit 260 performs control of notification of information that indicates the anomaly detected in steps S203 to S204 by using the display 20 (step S206). After notification is performed in step S206 or when no anomaly is detected in steps S203 to S204 (step S205, NO), the anomaly detection method ends.

The CPU 101 of the anomaly detection system 200 is a subject of each step (process) included in the anomaly detection method illustrated in FIG. 10. That is, the CPU 101 performs the anomaly detection method illustrated in FIG. 10 by reading the program used for executing the anomaly detection method illustrated in FIG. 10 from the memory 102 or the storage device 103, executing the program, and controlling each component of the anomaly detection system 200.

As described above, the anomaly detection system 200 according to the present example embodiment detects an anomaly by extracting the deviated distribution B2 in the log output quantity distributions B1 of various aggregate units and various devices. It is therefore possible to detect an abnormal distribution or an abnormal device by taking advantage of the features of the distribution for each aggregate unit and for each device.

Other Example Embodiments

Figure 11:
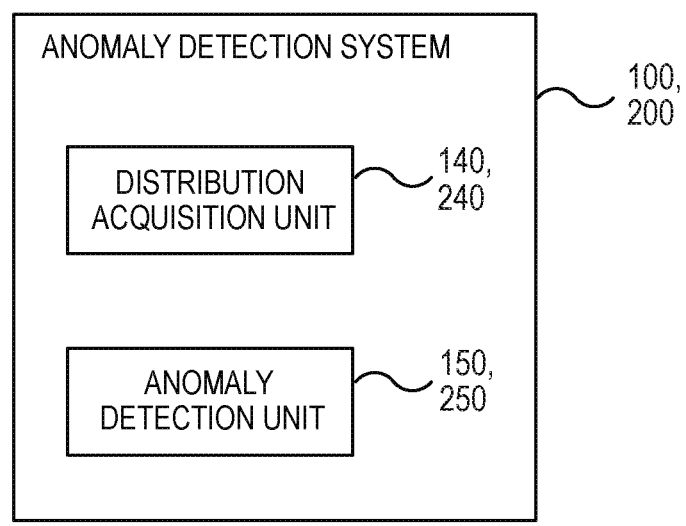
FIG. 11 is a block diagram of the anomaly detection system according to each example embodiment.

FIG. 11 is a schematic configuration diagram of the anomaly detection systems 100 and 200 according to respective example embodiments described above. FIG. 11 illustrates a configuration example by which each of the anomaly detection systems 100 and 200 functions as a device that detects an anomaly by using log output quantity distributions generated for different aggregate units and different devices. The anomaly detection systems 100 and 200 have distribution acquisition units 140 and 240 that acquire a plurality of distributions generated for each device that outputs logs and for each unit of a time range in which logs are aggregated and anomaly detection units 150 and 250 that detect an anomaly by using the plurality of distributions, and each of the plurality of distributions is a time-series distribution of the log output quantity in the unit.

The present invention is not limited to the example embodiments described above and can be properly changed within the scope not departing from the spirit of the present invention.

The scope of each of the example embodiments includes a processing method that stores, in a storage medium, a program that causes the configuration of each of the example embodiments to operate so as to implement the function of each of the example embodiments described above (more specifically, an anomaly detection program that causes a computer to perform the process illustrated in FIG. 7 and FIG. 10), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An anomaly detection method comprising steps of:

acquiring a plurality of distributions generated for each device that outputs logs and for each unit of a time range in which logs are aggregated; and detecting an anomaly by using the plurality of distributions, wherein each of the plurality of distributions is a time-series distribution of an output quantity of the logs in the unit.

(Supplementary Note 2)

The anomaly detection method according to supplementary note 1 further comprising a step of generating an analysis target distribution that is a time-series distribution of an output quantity of a log included in an analysis target log, wherein the step of acquiring selects a reference distribution that is the most similar to the analysis target distribution from the plurality of distributions, and wherein the step of detecting detects the anomaly in the analysis target log by comparing the analysis target distribution with the reference distribution.

(Supplementary Note 3)

The anomaly detection method according to supplementary note 2, wherein the step of acquiring calculates a similarity between the analysis target distribution and each of the plurality of distributions and selects, as the reference distribution, a distribution having the similarity that is greater than or equal to a predetermined threshold out of the plurality of distributions.

(Supplementary Note 4)

The anomaly detection method according to supplementary note 2 or 3, wherein the step of detecting calculates an anomaly degree of the analysis target distribution with respect to the reference distribution as a reference and detects the anomaly when the anomaly degree is out of a predetermined normal range.

(Supplementary Note 5)

The anomaly detection method according to supplementary note 1, wherein the anomaly is detected by extracting a distribution deviated from the plurality of distributions as an abnormal distribution.

(Supplementary Note 6)

The anomaly detection method according to supplementary note 5, wherein a similarity between the plurality of distributions is calculated, and a distribution deviated from the plurality of distributions is extracted based on the similarity between the plurality of distributions.

(Supplementary Note 7)

The anomaly detection method according to supplementary note 5 or 6, wherein the anomaly is detected by extracting, as an abnormal device, the device in which a quantity of the abnormal distribution or a ratio of the abnormal distribution for each device is greater than or equal to a predetermined threshold.

(Supplementary Note 8)

The anomaly detection method according to any one of supplementary notes 1 to 7, wherein the unit indicates a length of the time range and a condition satisfied by the time range.

(Supplementary Note 9)

An anomaly detection program that causes a computer to perform steps of:

acquiring a plurality of distributions generated for each device that outputs logs and for each unit of a time range in which logs are aggregated; and detecting an anomaly by using the plurality of distributions, wherein each of the plurality of distributions is a time-series distribution of an output quantity of the logs in the unit.

(Supplementary Note 10)

An anomaly detection system comprising:

a distribution acquisition unit that acquires a plurality of distributions generated for each device that outputs logs and for each unit of a time range in which logs are aggregated; and an anomaly detection unit that detects an anomaly by using the plurality of distributions, wherein each of the plurality of distributions is a time-series distribution of an output quantity of the logs in the unit.

What is claimed is:

1. An anomaly detection method, the method comprising:

acquiring, from a plurality of devices, a plurality of target logs, each including a plurality of distributions generated for each of the plurality of devices that outputs logs;

grouping the plurality of target logs according to a time range and a format of each of the plurality of target logs;

detecting an anomaly in a group of target logs by using a plurality of reference distributions corresponding to the time range and the format of the group of the target logs; and displaying the anomaly in the group of target logs on a display;

wherein each of the plurality of reference distributions is a time-series distribution of an output quantity in at least one format generated based on a rule of aggregating logs output in the past according to a predetermined time range.

2. The anomaly detection method according to claim 1, further comprises generating an analysis target distribution that is a time-series distribution of an output quantity of a target log included in the group of target logs, wherein the acquiring the plurality of target logs including the plurality of distributions further comprises selecting a reference distribution that is most similar to the analysis target distribution from the plurality of reference distributions, and wherein the detecting the anomaly further comprises detecting the anomaly in the group of the target logs by comparing the analysis target distribution with the reference distribution.

3. The anomaly detection method according to claim 2, wherein the acquiring the plurality of target logs including the plurality of distributions further comprises calculating a similarity between the analysis target distribution and each of the plurality of reference distributions and selecting, as the reference distribution, a distribution having the similarity that is greater than or equal to a predetermined threshold.

4. The anomaly detection method according to claim 2, wherein the detecting the anomaly further comprises calculating an anomaly degree of the analysis target distribution with respect to the reference distribution as a reference and detecting the anomaly when the anomaly degree is out of a predetermined normal range.

5. The anomaly detection method according to claim 1, wherein the anomaly is detected by extracting at least one distribution among the plurality of distributions deviating from the plurality of reference distributions as an abnormal distribution.

6. The anomaly detection method according to claim 5, wherein a similarity between the plurality of distributions is calculated, and a distribution deviating from the plurality of distributions is extracted based on the similarity between the plurality of distributions.

7. The anomaly detection method according to claim 5, wherein the anomaly is detected by extracting, as an abnormal device, a device among the plurality of devices in which a quantity of the abnormal distribution or a ratio of the abnormal distribution is greater than or equal to a predetermined threshold.

8. The anomaly detection method according to claim 1, wherein the grouping of the plurality of target logs is performed according to a predetermined length of the time range.

9. A non-transitory computer-readable storage medium in which an anomaly detection program is stored, the anomaly detection program causing a computer to:
- acquire, from a plurality of devices, a plurality of target logs, each including a plurality of distributions generated for each of the plurality of devices that outputs logs;
- grouping the plurality of target logs according to a time range and a format of each of the plurality of target logs;
- detect an anomaly in a group of target logs by using a plurality of reference distributions corresponding to the time range and the format of the group of the target logs; and
- displaying the anomaly in the group of target logs on a display;
- wherein each of the plurality of reference distributions is a time-series distribution of an output quantity in at least one format generated based on a rule of aggregating logs output in the past according to a predetermined time range.

10. An anomaly detection system comprising:
one or more processors configured to:
- acquire, from a plurality of devices, a plurality of target logs, each including a plurality of distributions generated for each of the plurality of devices that outputs logs;
- grouping the plurality of target logs according to a time range and a format of each of the plurality of target logs;
- detect an anomaly in a group of target logs by using a plurality of reference distributions corresponding to the time range and the format of the group of the target logs; and
- displaying the anomaly in the group of target logs on a display;
- wherein each of the plurality of reference distributions is a time-series distribution of an output quantity in at least one format generated based on a rule of aggregating logs output in the past according to a predetermined time range.

* * * * *